United States Patent
Charlet et al.

(10) Patent No.: US 7,822,786 B2
(45) Date of Patent: Oct. 26, 2010

(54) APPARATUS, SYSTEM, AND METHOD FOR DEFINING A METADATA SCHEMA TO FACILITATE PASSING DATA BETWEEN AN EXTENSIBLE MARKUP LANGUAGE DOCUMENT AND A HIERARCHICAL DATABASE

(75) Inventors: Kyle J. Charlet, Morgan Hill, CA (US); Douglas M. F. Hembry, Los Gatos, CA (US); Christopher M. Holtz, San Jose, CA (US); Carol M. Wiedenmann, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 11/948,839

(22) Filed: Nov. 30, 2007

(65) Prior Publication Data

US 2008/0091710 A1    Apr. 17, 2008

Related U.S. Application Data

(63) Continuation of application No. 10/758,890, filed on Jan. 16, 2004, now Pat. No. 7,418,456.

(51) Int. Cl.
*G06F 17/30* (2006.01)
(52) U.S. Cl. .................. 707/809; 707/803; 715/210
(58) Field of Classification Search .............. 707/10, 707/102, 803, 809; 715/210; 709/247
See application file for complete search history.

(56) References Cited

U.S. PATENT DOCUMENTS 5,835,755 A    11/1998   Stellwagen et al. ......... 395/600

6,012,067 A    1/2000    Sarkar ..................... 707/103

(Continued)

FOREIGN PATENT DOCUMENTS

| JP | 2003256455 | 3/2002 |
|---|---|---|
| WO | WO0221339 | 3/2002 |
| WO | WO02101579 | 12/2002 |

OTHER PUBLICATIONS

*Combining RDF and XML Schemas to Enhance Interoperability Between Metadata Application Profiles*—Hunter, J. et al.; 2001 IEEE/ACM Digital Library.

(Continued)

*Primary Examiner*—Shahid A Alam
(74) *Attorney, Agent, or Firm*—Kunzler Needham Massey & Thorpe

(57) ABSTRACT

An apparatus, system, and method are provided for defining a metadata schema to facilitate passing data between an XML document and a hierarchical database. The invention includes a database accessor, a document accessor, and an association module. The database accessor accesses a database schema indicative of database field names and a hierarchical structure for a hierarchical database. The document accessor accesses a document schema that defines the hierarchical structure, content data syntax, and semantics of valid, well-formed, XML documents that can be passed into and out of the hierarchical database. The document schema also includes at least one XML element name that maps to a corresponding database field name in the database schema. The association module associates the database schema and the document schema to provide a metadata schema that enables data to be passed between an XML document and the hierarchical database.

18 Claims, 12 Drawing Sheets

U.S. PATENT DOCUMENTS

| | | | |
|---|---|---|---|
| 6,128,619 A | 10/2000 | Fogarasi et al. | 707/102 |
| 6,141,660 A | 10/2000 | Bach et al. | 707/103 |
| 6,418,448 B1 | 7/2002 | Sarkar | 707/104.1 |
| 6,445,679 B1 * | 9/2002 | Taniguchi et al. | 370/232 |
| 6,611,843 B1 | 8/2003 | Jacobs | 707/102 |
| 6,618,727 B1 | 9/2003 | Wheeler et al. | 707/10 |
| 6,738,759 B1 | 5/2004 | Wheeler et al. | 707/3 |
| 6,772,139 B1 | 8/2004 | Smith | 707/3 |
| 6,810,429 B1 | 10/2004 | Walsh et al. | 709/246 |
| 6,829,606 B2 | 12/2004 | Ripley | 707/5 |
| 6,845,376 B1 | 1/2005 | Johnson | 707/100 |
| 6,862,590 B2 | 3/2005 | Nonko et al. | 707/3 |
| 6,871,204 B2 | 3/2005 | Krishnaprasad et al. | 707/102 |
| 6,889,360 B1 | 5/2005 | Ho et al. | 715/513 |
| 6,901,403 B1 | 5/2005 | Bata et al. | 707/101 |
| 6,910,216 B2 | 6/2005 | Abileah et al. | 719/319 |
| 6,980,995 B2 | 12/2005 | Charlet et al. | 707/102 |
| 6,988,093 B2 | 1/2006 | Pic et al. | 707/1 |
| 7,024,425 B2 | 4/2006 | Krishnaprasad et al. | 707/104.1 |
| 7,047,253 B1 | 5/2006 | Murthy et al. | 707/103 R |
| 7,085,773 B2 | 8/2006 | Dorsett | 707/104.1 |
| 7,089,266 B2 | 8/2006 | Stolte et al. | 707/104.1 |
| 7,096,224 B2 | 8/2006 | Murthy et al. | 707/100 |
| 7,185,024 B2 | 2/2007 | Zhou et al. | 707/104.1 |
| 7,272,594 B1 | 9/2007 | Lynch et al. | 707/3 |
| 2002/0078094 A1 | 6/2002 | Krishnaprasad et al. | 707/513 |
| 2002/0143521 A1 | 10/2002 | Call | 704/1 |
| 2003/0014397 A1 | 1/2003 | Chau et al. | 707/3 |
| 2003/0101194 A1 | 5/2003 | Rys et al. | 707/101 |
| 2003/0226109 A1 | 12/2003 | Adamson et al. | 715/513 |
| 2004/0068527 A1 | 4/2004 | Smith | 707/204 |
| 2004/0093559 A1 | 5/2004 | Amaru et al. | 715/502 |
| 2005/0050074 A1 | 3/2005 | Jain et al. | 707/100 |
| 2005/0060300 A1 | 3/2005 | Stolte et al. | 707/3 |

OTHER PUBLICATIONS

*XAS: A System for Accessing Componentized, Virtual XML Documents*—Lo, M-L. et al.; 2001 IEEE/ACM Digital Library.
*Edutella: A P2P Networking Infrastructure Based on RDF*—Nejdl, W. et al.; 2002 IEEE/ACM Digital Library.

* cited by examiner

240

```
<?xml version="1.0" encoding="UTF-8"?>
<xsd:schema xmlns:xsd="http://www.w3.org/2001/XMLSchema"
        xmlns:ims="http://www.ibm.com/ims"
        xmlns="http://www.ibm.com/ims/PSBName/PCBName"
    targetNamespace="http://www.ibm.com/ims/PSBName/PCBName"
        elementFormDefault="qualified">
    <xsd:annotation>
        <xsd:appinfo>
            <ims:DLI mode="store"/>
        </xsd:appinfo>
    </xsd:annotation>
    <!-- Root Element -->
    <xsd:element name="Dealership">
    <xsd:annotation>
        <xsd:appinfo>
            <ims:intact>
                <ims:sideSegment name="sidesegname1">
                    <ims:selector xpath="Model/Order"/>
                    <ims:field xpath="OrderNo"/>
                </ims:sideSegment>
                <ims:sideSegment name="sidesegname2">
                    <ims:selector xpath=""/>
                    <ims:field xpath="//amount"/>
                </ims:sideSegment>
            </ims:intact>
        </xsd:appinfo>
    </xsd:annotation>
        ...
```

246 — schema declaration block
244 — `<xsd:annotation>` markers
242a — `<ims:DLI mode="store"/>`
242b — `<ims:intact>`
242c — `<ims:sideSegment>` contents

Fig. 2D

APPARATUS, SYSTEM, AND METHOD FOR DEFINING A METADATA SCHEMA TO FACILITATE PASSING DATA BETWEEN AN EXTENSIBLE MARKUP LANGUAGE DOCUMENT AND A HIERARCHICAL DATABASE

RELATED APPLICATIONS

This application is a continuation of U.S. patent application Ser. No. 10/758,890 filed on Jan. 16, 2004, entitled APPARATUS, SYSTEM, AND METHOD FOR DEFINING A METADATA SCHEMA TO FACILITATE PASSING DATA BETWEEN AN EXTENSIBLE MARKUP LANGUAGE DOCUMENT AND A HIERARCHICAL DATABASE.

BACKGROUND OF THE INVENTION

1. Field of the Invention

The invention relates to database systems. Specifically, the invention relates to apparatus, systems, and methods for defining a metadata schema to facilitate passing data between an eXtensible Markup Language (XML) document and a hierarchical database.

2. Description of the Related Art

Today, business applications increasingly rely on XML documents to N exchange data. Generally, modern software applications communicate with each other over the Internet using XML documents as a common data interchange language for Business to Business (B2B) and Business to Consumer (B2C) communications. Technologies such as web-servers, servlets, web applications, web services, and the like generally rely on some fashion of data organized according to the eXtensible Markup Language Specification.

Typically, these same software applications then communicate the data in the XML document to database servers for storage in a database. Generally, before an XML document is stored in a database, the XML document is analyzed to ensure that the XML document is a "valid" XML document. An XML schema is used to validate an XML document. As used herein, references to "an XML document" mean that the XML document is a valid XML document according to a predefined XML schema. Because an XML document provides such flexibility in the organization and types of XML elements, XML documents are validated to ensure that they are organized as expected. An invalid XML document may lead to unpredictable or erroneous results in software modules using the invalid XML document.

An XML schema defines the structure, organization, and data types that are acceptable in all corresponding XML documents. The XML schema defines a set of XML elements, XML element attributes, and organization among the XML elements that is desired. The XML schema serves as a vocabulary for the XML elements. Consequently, the XML schema defines a superset of valid XML documents. The valid XML documents include one or more of the XML elements, XML attributes, and structure among the XML elements as defined in the XML schema.

Typically, prior to storing the XML document, the XML document is validated. Generally, two types of databases may store the data in the XML document, hierarchical or relational. Each type of database has different benefits and limitations, which will be discussed in more detail below.

Generally, the databases store the data of an XML document in two different formats. In one aspect, the raw data contained in the elements of the XML document are removed from the XML document and stored in the database. Data stored in this manner is referred to herein as "decomposed" data because the formatting of the XML document is removed to store only the raw data. In another aspect, the raw data including the formatting that comprises the XML document are stored in the database. When the XML document is stored in the database in this manner, this is referred to herein as storing the XML document "intact" because the formatting of the XML document or an XML sub-tree is preserved within the database.

To control costs, it is desirable that modern technologies such as XML documents be capable of readily interfacing with existing computer and information technology without significantly modifying the existing computer and information technology. For example, large corporations, governments, and other entities continue to use legacy applications, which are software programs designed, written, and maintained for large, mission-critical computers, such as mainframes. These entities have invested large amounts of work and money into developing and maintaining the legacy applications. In addition, these applications have been tested and refined to operate very efficiently and with minimal errors. Legacy applications continue to manage a high percentage of the everyday transactions and data for these businesses.

Similarly, many of these legacy applications continue to store and retrieve data using hierarchical databases, such as IBM's Information Management System (IMS), instead of common relational databases such as the Oracle database available from the Oracle corporation. To facilitate storing and retrieving data in XML documents (referred to herein as "XML data"), functionality for passing XML data between XML documents and relational databases has been developed. Generally, this functionality is integrated into the database servers for relational databases. Consequently, users' versions of the database servers must be updated to enable support for passing of data between an XML document and a relational database.

Unfortunately, no tools exist for passing XML documents and/or XML data between an XML document and a hierarchical DB, one example of which is IMS. Certain tools exist for passing XML data between an XML document and popular relational databases. These tools rely on schema information that relates the XML document to the relational database.

The schema information is stored in a proprietary format designed specifically to allow for passing of XML data between an XML document and the relational database. Often, a proprietary format is used because relational databases can vary considerably in how relationships are represented. Proprietary schema information requires that developers and users passing XML data to and from relational databases learn a new syntax and semantics. This learning curve may be steep. Often, the proprietary schema information is stored in binary format requiring special editors to create and modify the proprietary schema information.

In addition, the proprietary schema information generally must be revised or constantly modified in order to ensure that the proprietary schema information handles passing all the various kinds of desired valid XML documents. The XML language is a very flexible language which allows definition of unique XML elements to meet a particular need. The proprietary schema information must be specifically updated to handle cases of XML documents that include the unique XML elements. Consequently, the proprietary schema information is either constantly updated or once defined severely limits the set of XML documents that may be passed into and out of the relational database.

As mentioned, even proprietary schema information is not currently available that will enable passing XML data between XML documents and a hierarchical database. In addition, hierarchical databases such as IMS may include user-defined database views. These views may control not only what part of the database a user or user application may access, but also security and authentication features for protecting the data. Examples of such views and user-defined access features include the Program Status Block (PSB) and Program Control Block (PCB) provided by IMS. In order to properly store and retrieve XML data for the hierarchical database, the user-defined database view(s) needs to be identified. These views may be changed as needed by a database administrator. Proprietary schema information does not currently account for user-defined database views for either hierarchical or relational databases.

Accordingly, a need exists for an apparatus, system, and method for defining a metadata schema to facilitate passing data between an XML document and a hierarchical database. The apparatus, system, and method should define a metadata schema that complies with an accepted, text-based, industry standard such that the learning curve is minimized. In addition, the apparatus, system, and method should define a metadata schema that serves a dual purpose, one to define a set of valid, well-formed XML documents that may be passed into and out of a hierarchical database, and two to facilitate mapping data from a source XML document into and out of a particular hierarchical database. Further the apparatus, system, and method should define a metadata schema that accommodates user-defined database views of the hierarchical database and is readily modifiable to adjust to changes in the user-defined database views.

BRIEF SUMMARY OF THE INVENTION

The present invention has been developed in response to the present state of the art, and in particular, in response to the problems and needs in the art that have not yet been met for passing data between an XML document and a hierarchical database. Accordingly, the present invention has been developed to provide an apparatus, system, and method for passing data between an XML document and a hierarchical database that overcomes many or all of the above-discussed shortcomings in the art.

An apparatus according to the present invention includes a database accessor, a document accessor, and an association module. The database accessor accesses a database schema indicative of database field names and a hierarchical structure for a hierarchical database. The document accessor accesses a document schema that defines the hierarchical structure, content data syntax, and semantics of valid, well-formed, XML documents that can be passed into and out of the hierarchical database. The document schema also includes an XML element name that maps to a database field name in the database schema. The association module associates the database schema and the document schema to provide a metadata schema that enables data to be passed between an XML document and the hierarchical database.

In certain embodiments, the document schema includes at least one directive metadata element. The directive metadata element may cause the default behavior of passing XML data between an XML document and a hierarchical database to be modified as needed.

A method of the present invention is also presented for defining a metadata schema to facilitate passing data between an XML document and a hierarchical database. In one embodiment, the method includes accessing a database schema indicative of database field names and a hierarchical structure for a hierarchical database. Next, a document schema is accessed that defines the hierarchical structure, content data syntax, and semantics of valid, well-formed, XML documents that can be passed into and out of the hierarchical database. Finally, the database schema and document schema are associated to provide a metadata schema that enables data to be passed between an XML document and the hierarchical database.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2D is an exemplary section of an XML schema in accordance with the present invention;

DETAILED DESCRIPTION OF THE INVENTION

Figure 1:
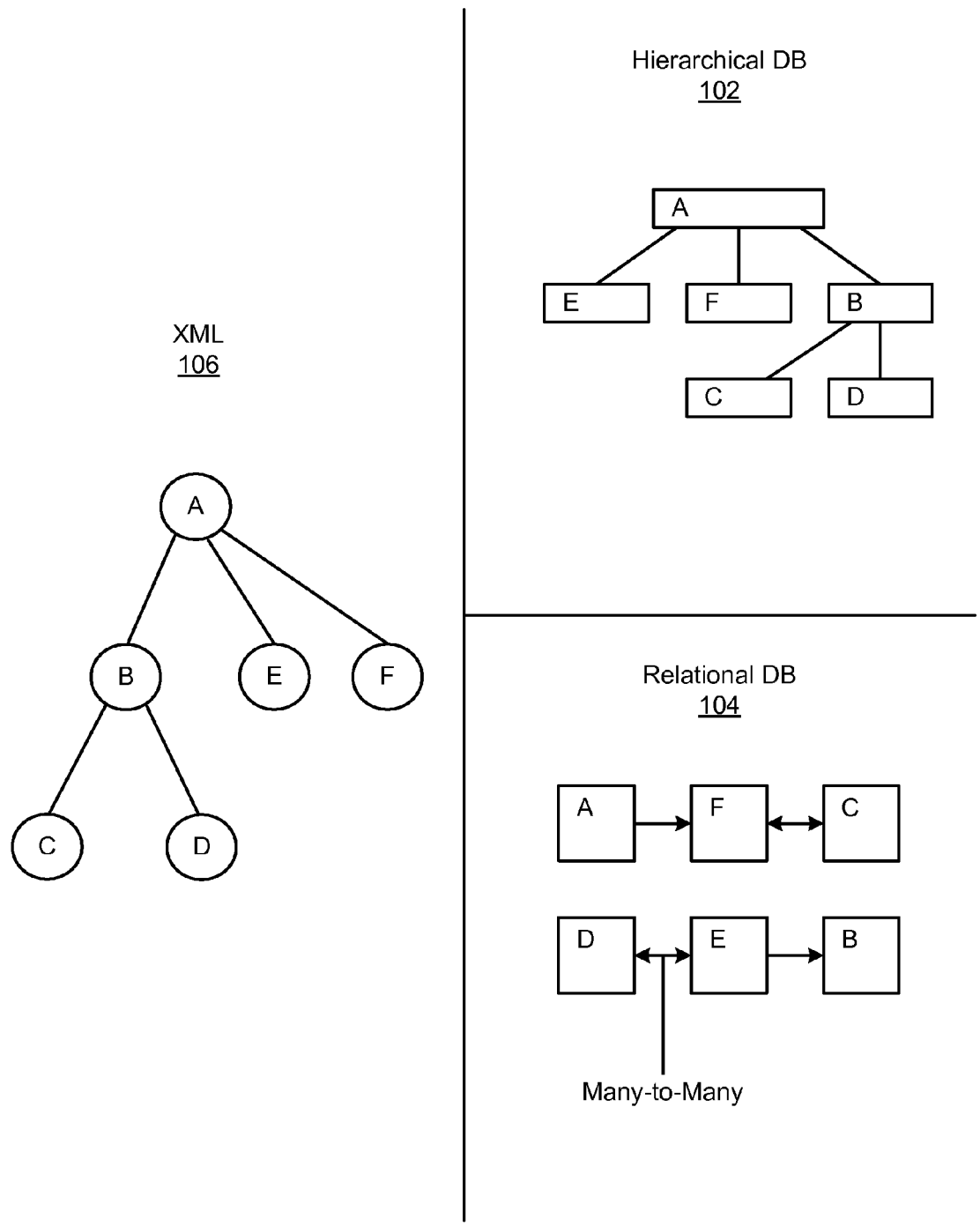
FIG. 1 is a conceptual block diagram illustrating relational data structures for nodes in a relational database, a hierarchical database, and an XML document.

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 9, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates three exemplary diagrams, a hierarchical database diagram 102, a relational database diagram 104, and an XML document diagram 106. The diagrams 102, 104, 106, illustrate the relationship between database nodes (and corresponding XML elements in the XML document).

Each diagram includes database nodes represented by the letters A-F. Each database node associates related data. Of course each database may include different terminology for the database node, fields within database nodes, and relationships between the nodes. For example, in a hierarchical database, such as IMS, a database node is referred to as a segment that includes one or more database fields storing raw data. In a relational database, the database node may correspond to a database table that includes one or more database columns. The database fields of a hierarchical database and columns of a relational database correspond to XML sub-elements within an XML element of an XML document.

The XML document includes a root XML element that may include one or more XML sub-elements, which sub-elements may each include one or more sub-elements. Those of skill in the art will recognize, based on the context, that references to an XML element herein refers to either an XML root element or XML sub-element as appropriate. Typically, the structure of XML sub-elements (nodes B-F) in relation to the root XML element is represented by nesting XML sub-elements within begin and end tags of appropriate parent elements. The XML root element and XML sub-elements are organized in a parent-child relationship. Each parent node may have many child nodes as children. But, a child node may have only one parent node. This relationship constitutes a hierarchical relationship.

Advantageously, the hierarchical database is also structured according to the same parent-child relationship as required in an XML document. The hierarchical database includes a root node and one or more child nodes related to the root node. Each child node may also have one or more child nodes. Certain hierarchical databases have been managing data according to the parent-child relationships for many years. Consequently, many complex and expensive software applications have been built around the speed, reliability, stability, and features such as indexing and data preservation provided by these hierarchical databases.

In contrast, the relational database diagram 104 illustrates database nodes A-F organized according to relationships that are not limited to strictly parent-child relationships. One reason relational databases have been widely used is that the relational database can represent many-to-many relationships between database nodes. By way of example, suppose database node D represents parts and database node E represents invoices. Typically, an invoice can include many parts and a single part can appear on many invoices.

Many-to-many relationships allow for the amount of data duplication in the database to be minimized to a higher extent than may be possible in a hierarchical database. However, as a consequence, queries for the data in many-to-many relationships may be slower, more complicated, and involve certain complex join queries.

The structure among database nodes of the hierarchical database diagram 102 allows for faster retrieval and storage of data than in the relational database diagram 104. In addition, the database nodes of the hierarchical database diagram 102 follow the same parent-child relationship constraints. Consequently, an XML document (which is organized in a hierarchical fashion) with its XML root element and XML sub-elements is readily mapped to corresponding database nodes of the hierarchical database.

Note, however, that the hierarchical structure between the XML diagram 106 and the hierarchical database diagram 102 does not match. For example, XML element B descends from root XML element A in the XML diagram 106 and database node B descends from database node F in the hierarchical database diagram 102. The present invention allows for data to be mapped between XML element B and the database node B even though the hierarchical structures are not exactly the same.

Figure 2A:
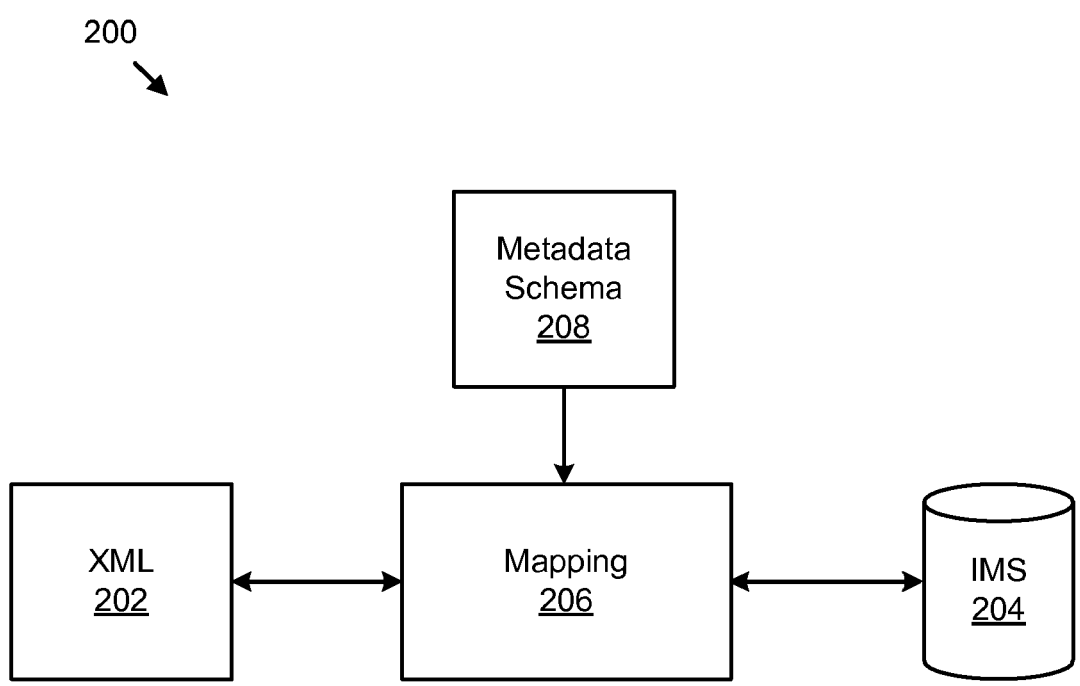
FIG. 2A is a logical block diagram illustrating one embodiment of an apparatus in accordance with the present invention.

Referring now to FIG. 2A, a logical block diagram illustrates major components in one embodiment of an apparatus 200 for passing data between an XML document 202 and a hierarchical database 204. The apparatus 200 includes a valid XML document 202, a hierarchical database 204, a mapping module 206, and a metadata schema 208.

The XML document 202 is a valid XML document. As mentioned above, this means that there exists an XML schema or Document Type Definitions (DTD) file that defines all the XML elements that may appear on the XML document 202, how those XML elements may be related in a parent-child hierarchy, data types for data in the XML elements, and an encoding format for the data. Preferably, the XML document 202 is validated by another tool prior to being provided for storage within the hierarchical database 204.

The hierarchical database 204 may be any standard hierarchical database. Preferably, the hierarchical database 204 is IMS. The hierarchical database 204 supports basic interface commands, such as get, insert, replace, delete, and all, for manipulating data of a single database node or database field. Preferably, the hierarchical database 204 is not modified in any way to accommodate use of the hierarchical database 204 with the present invention. In this manner, data from XML documents stored in the hierarchical database 204 in decomposed format may be used by legacy applications and other users of the hierarchical database 204 without concern that the data was provided originally in an XML document 202.

The mapping module 206 maps data between the XML document 202 and the hierarchical database 204. In one embodiment, the mapping module 206 is external to the hierarchical database 204 and passes the data between the XML document 202 and the hierarchical database 204 using the metadata schema 208 and external database commands. To store or retrieve data in decomposed and mixed decomposed and intact formats, the mapping module 206 relies on the metadata schema 208. If the whole XML document is to be saved in intact format, the mapping module 206 may not need the metadata schema 208.

The mapping module 206 and metadata schema 208 will be described in more detail below. The metadata schema 208 includes the hierarchical structure of the XML document 202, the hierarchical structure of the hierarchical database 204, and one or more database field names that map to corresponding XML element names in the XML document 202. The mapping module 206 maps between XML elements in the XML document 202 and database nodes in the hierarchical database 204 by matching the XML element name to the database field name. Once the mapping has been made, the mapping module 206 performs any necessary type and/or encoding format conversions, and stores the data in the appropriate target. If an XML document 202 is being stored, the target is a database field in the database 204 at the appropriate database node. If an XML document 202 is being retrieved, the target is a generated XML element stored in the XML document 202.

Figure 2B:
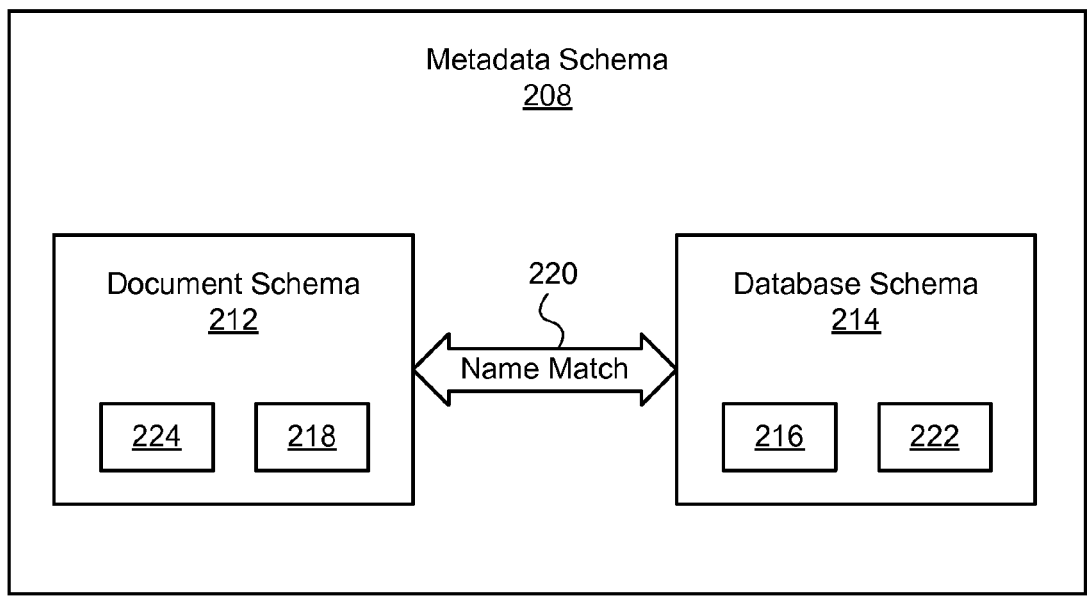
FIG. 2B is a logical block diagram illustrating one embodiment of a metadata schema in accordance with the present invention.

In FIG. 2B, one embodiment of a metadata schema 208 is illustrated. As mentioned, the metadata schema 208 allows data in one hierarchical structure to be mapped to another hierarchical structure. In one embodiment, the metadata schema 208 comprises a document schema 212 associated with the XML document 202 and a database schema 214 associated with the hierarchical database 204. The schemas 212, 214 comprise metadata relating, respectively, to XML elements, database fields, data types, data encoding, as well as the hierarchical structure of the XML document 202 and hierarchical database 204.

Those of skill in the art will recognize that the metadata in the schemas 212, 214 may be organized and formatted according to any format including proprietary formats. For example, the document schema 212 may comprise a listing of XML elements and the data types for the XML elements in a name-value pair arrangement. The structure of XML elements may be represented by lists of element names. The lists may include sub-lists of XML element names that represent the parent-child relationships.

In a certain embodiment, the database schema 214 associated with the hierarchical database 204 is a schema that may be used by a variety of software applications accessing the hierarchical database 204. For example, suppose the hierarchical database 204 comprises an IMS database. Typically, IMS itself includes no metadata for the database nodes and database fields. Instead, in one embodiment, metadata for an IMS database may be stored and maintained by other components such as Java classes. The Java classes may define the database nodes, database fields, and hierarchical structure between database nodes in the IMS database. These Java classes may be defined within a file and/or instantiated into Java objects that are referenced to provide the features of the database schema 214 during run-time.

In one embodiment, the database schema 214 includes database field names 216 and associated database field types for database fields in the database 204. In addition, the document schema 212 associated with the XML document 202 preferably includes XML element names 218 that match the database field names 216 in the database schema 214 associated with the database 204. Typically, the document schema 212 includes data type identifiers associated with each XML element name 218. Preferably, there is a one-to-one correspondence 220 between database field names 216 and XML element names 218.

The metadata schema 208 also includes a first representation 222 of the hierarchical structure of the hierarchical database 204 and a second representation 224 of the hierarchical structure of valid XML documents 202 that may be stored and retrieved from the hierarchical database 204. The first representation 222 and second representation 224 may be any data structure capable of capturing a parent-child hierarchical relationship.

In one embodiment, the first representation 222 comprises a list-sub-list structure within a class defined in a set of Java classes that make up the database schema 214. The second representation 224 may reside in the document schema 212 associated with the XML document 202. The second representation 224 may comprise a nested structure of markup language tags as used in an XML schema (XSD) file.

Preferably, the document schema 212 associated with the XML document 202 is an XSD file (an XML schema 212) generated based on the hierarchical database 204. Although the XML schema 212 is preferably generated from the hierarchical database 204, the first representation 222 and second representation 224 may not necessarily match. However, the hierarchical structure of the hierarchical database 204 matches the hierarchical structure of the first representation 222 and the hierarchical structure of the XML document 202 matches the hierarchical structure of the second representation 224.

Implementing the document schema 212 as an XML schema 212 provides distinct advantages. First, the XML schema definition language is an industry standard. Consequently, the format, syntax, and semantics are well known and understood by potential users and developers. Second, an XML schema 212 is human-readable as well as machine readable. Consequently, an XML schema 212 may be readily revised and edited as necessary. Third, using the XML schema 212 allows a single structure to serve both for passing of data between and XML document 202 and a hierarchical database 204 as well as the variety of uses being made of XML schemas 212. A separate metadata schema related to the XML document 202 need not be defined.

Figure 2C:
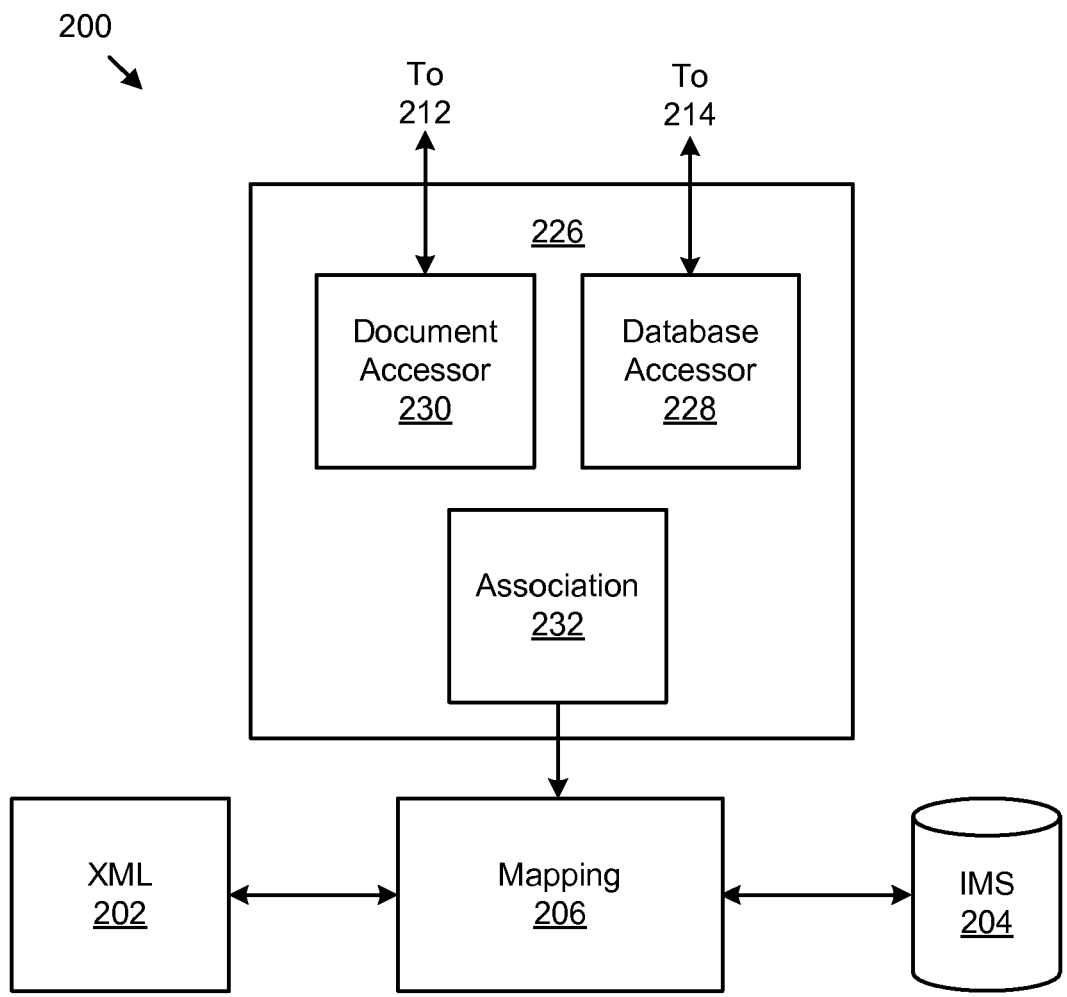
FIG. 2C is a logical block diagram illustrating an apparatus in accordance with the present invention.

FIG. 2C illustrates one embodiment of an apparatus 226 in accordance with the present invention. In FIG. 2B, the metadata schema 208 may comprise a single data structure such as a file or a pair of files that are both accessed to form the metadata schema 208. Alternatively, as illustrated in FIG. 2C, an apparatus 226 may provide a metadata schema 208 that enables data to be passed between an XML document 202 and the hierarchical database 204.

The apparatus 226 may comprise a database accessor 228, a document accessor 230 and an association module 232. The database accessor 228 may be configured to access a database schema 214 from a repository. Similarly, the document accessor 230 may be configured to access a document schema 212 from a repository. The repositories may comprise files, a databases, software objects, web services, or the like. Preferably, the document schema 212 comprises an XML schema 212 derived from the hierarchical database 204.

The association module 232 associates the database schema 214 and document schema 212 such that a metadata schema 208 is made available to a mapping module 206. In one embodiment, the association module 232 combines the database schema 214 and document schema 212 to form a single metadata schema file 208. Alternatively, the association module 232 may open a database schema 214 file and a document schema 212 file and maintain access to the files until the mapping module 206 is finished passing data between the XML document 202 and the hierarchical database 204.

As mentioned above, using an XML schema 212 as the document schema 212 provides advantages. For example, features of the XML schema definition may be used to modify the passing behavior of data between an XML document 202 and a hierarchical database 204 without affecting how other software applications use the XML schema 212. In one embodiment, directive metadata elements are included in the XML schema 212 to modify how data is passed between an XML document 202 and a hierarchical database 204.

FIG. 2D illustrates a representative example of a portion 240 of XML schema 212 that includes directive metadata elements 242. The portion 240 begins at the top of the XML schema 212. Directive metadata elements 242 provide instructions, commands, or information which may modify the default behavior as data is passed between an XML document 202 and a hierarchical database 204. In particular, the directive metadata element 242 cause modules such as a mapping module 206 to pass the data differently in order to provide enhanced features for XML documents 202 stored and retrieved from a hierarchical database 204.

In a preferred embodiment, directive metadata elements 242 are embedded within XML schema elements 244 such that the XML schema 212 may be processed and reviewed normally by third-party software applications. The XML schema elements 244 do not affect operation of these third-party software applications. But, the directive metadata elements 242 within the XML schema elements 244 facilitate passing data between an XML document 202 and a hierarchical database 204. Directive metadata elements 242 may be added by a user/developer or a software module that generates the XML schema 212.

In one embodiment, the XML schema elements 244 comprise a pair of elements. Specifically, an "appinfo" element is nested within an "annotation" element. The annotation element signals that what follows is documentation (i.e. not schema information related to any particular XML element). The "appinfo" element indicates to a software application "reading" the XML schema 212 that what is within the "appinfo" element may comprise a directive or command that may or may not be applicable to that software application.

Because the directive metadata elements 242 may be included without interfering with other users of the XML schema 212, a variety of directive metadata elements 242 may be defined. In one embodiment, directive metadata elements 242 comprise a hierarchical database indicator directive 242a, storage and retrieval directive 242b, and an index directive 242c.

Preferably, the hierarchical database indicator directive 242a follows a header 246 of the XML schema 212 and applies to the whole XML schema 212. The hierarchical database indicator directive 242a indicates the interface to be used in communicating with the hierarchical database 204 as well as the names of any views within the hierarchical database 204 to which the XML schema 212 relates. In addition, the hierarchical database indicator directive 242a may indicate a mode which identifies whether the XML schema 212 can be used for storage of an XML document 202 in the database 204, retrieval of XML documents 202 from the database 204, or both.

For example in FIG. 2D, with an IMS database 204, the hierarchical database indicator directive 242a indicates that the "DLI" interface is to be used. The DLI indicator may cause a mapping module 206 to refer to the namespace information in the header 246 to determine the proper views for storage and retrieval of XML documents 202. Directive metadata elements 242 may be qualified or unqualified. In FIG. 2D the directive metadata elements 242 are qualified. The xmlns="http://www.ibm.com/ims/PSBName/PCBName" indicator identifies the name of the Program Status Block (PSB) and Program Control Block (PCB) that are to be used in passing data between XML documents 202 and the IMS database having the named PCB view.

The PSB and PCB information allow the XML schema 212 to be properly associated with a particular view and access permissions for the database 204. In this manner, even though a database administrator may define a customized PSB and one or more PCBs, data can still be passed between the XML documents 202 and the appropriate database nodes of the database 204.

A "retrieve" mode may indicate that this XML schema 212 may only be used to retrieve XML documents 202 from the identified views. A "store" mode may indicate that XML documents 202 may be stored and retrieved. Of course the hierarchical database indicator directive 242a, may include other indicators and/or parameters within the scope of the present invention.

The storage and retrieval directive 242b may cause the XML element corresponding to the XML schema element containing the storage and retrieval directive 242b to be stored or retrieved in a manner other than the default format. For example, suppose the default format for storing XML elements is decomposed. If a mapping module 206 finds a storage and retrieval directive 242b with an "intact" indicator during a storage operation, the sub-tree of the XML document 202 beginning with the XML element corresponding to the XML schema element containing the storage and retrieval directive 242b will be stored in intact format instead of decomposed format.

An index directive 242c indicates that the next XML element should be processed so as to facilitate indexing of the next XML element. For example, as will be discussed in more detail below, storage of an XML document 202 in intact format does not typically permit indexing and searching on the XML document 202. However, use of index directives 242c allows elements of the XML document 202 to be indexed and searched using queries.

In one embodiment, the index directive 242c includes a "sideSegment" indicator and a name. The index directive 242c causes certain elements of the XML document 202 to be stored in a sidesegment. A secondary index may then be created to reference the sidesegment and provide indexing and searching of intact stored XML documents 202. The index directive 242c may include a "selector" and "field" sub-elements which indicate which XML element is to be stored in the sidesegment. In one embodiment, the "selector" and "field" values are concatenated to form an XML Path Language (Xpath) expression. The Xpath expression points to the XML element that is to be stored in the sidesegment. As illustrated in FIG. 2D, multiple index directives 242c having unique names may be included in the XML schema 212.

Figure 3:
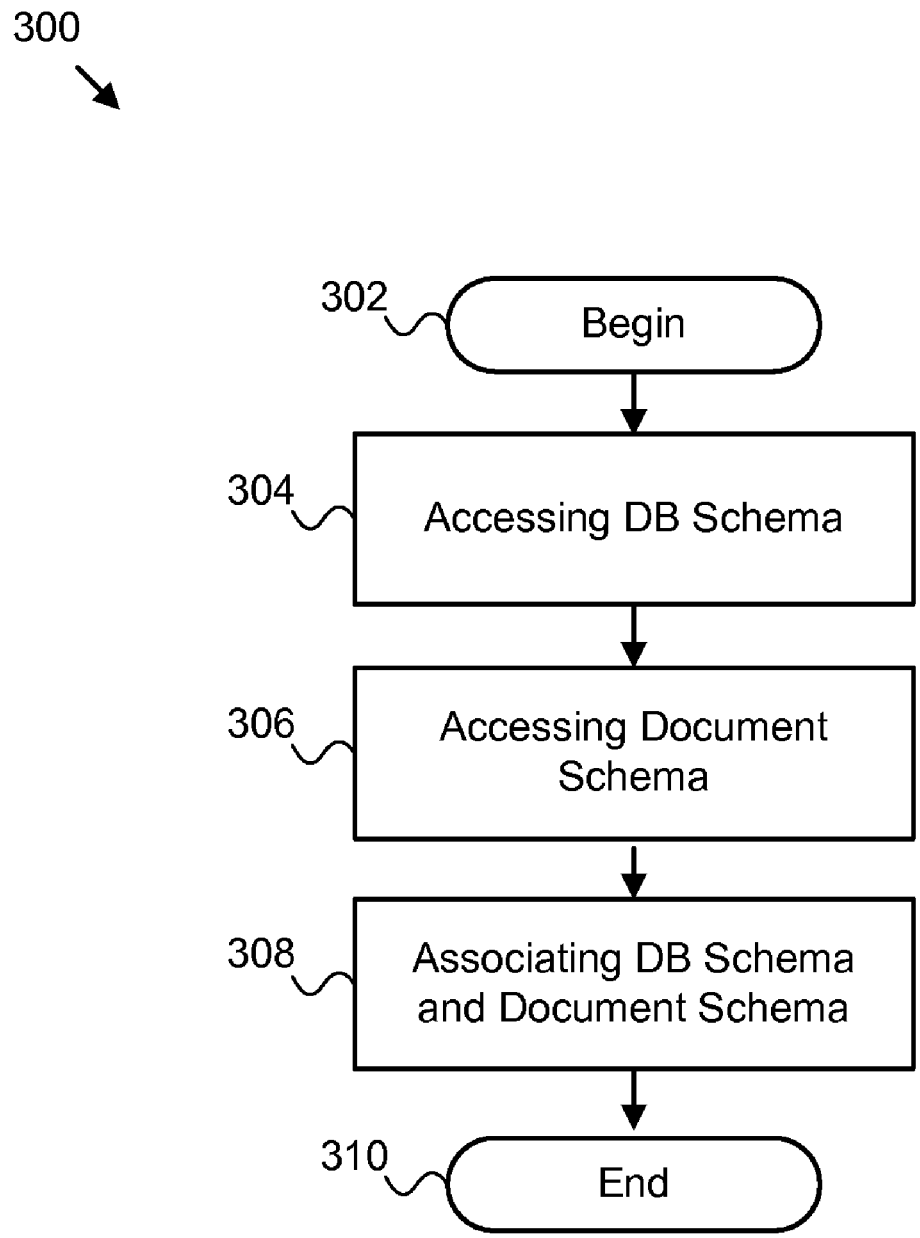
FIG. 3 is a schematic flow chart diagram illustrating a method in accordance with the present invention.

FIG. 3 illustrates a flow chart of a method 300 for defining a metadata schema 208 to facilitate passing data between an XML document 202 and a hierarchical database 204. The method 300 begins 302 when a metadata schema 208 is desired. First, a database schema 214 indicative of database field names and hierarchical structure for a hierarchical database 204 is accessed 304. Next, a document schema 212 that defines the hierarchical structure content data syntax, and semantics of valid, well-formed, XML documents that may be passed into and out of the hierarchical database 204 is accessed 306. Preferably, the document schema 212 includes one or more XML element names that map to one or more corresponding database field names in the database schema 214.

Finally, the database schema 214 is associated 308 with the document schema 212 to provide a metadata schema 208. The association may include combining the database schema 214 and document schema 212, providing joint access to both the database schema 214 and the document schema 212, and the like. The metadata schema 208 facilitates passing of data between an XML document 202 and a hierarchical database 204. Once a metadata schema 208 is provided, the method ends 310.

Figure 4:
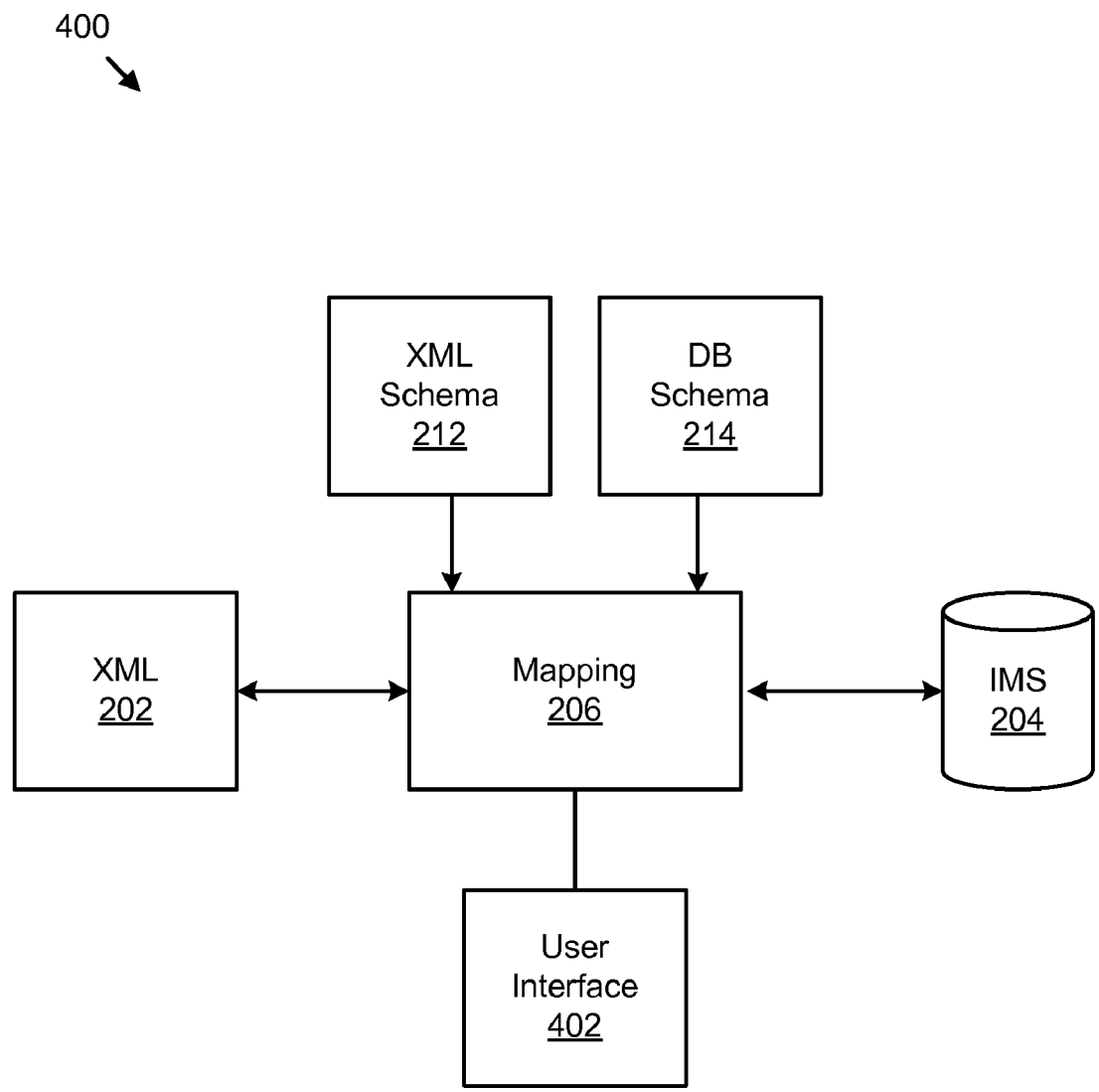
FIG. 4 is a schematic block diagram illustrating a system according to one embodiment of the present invention.

FIG. 4 illustrates a system 400 for passing data between a valid XML document 202 and a hierarchical database 204. The system 400 includes an XML document 202, mapping module 206, and hierarchical database 204 very similar to those components discussed in relation to the embodiment of FIG. 2A.

In addition, the mapping module 206 uses an XML schema 212 and database schema 214 similar to those described in relation to FIG. 2B. Specifically, a document schema 212 comprises an XML schema 212 that complies with the standard XML schema format version 1.0 as set forth by the World Wide Web consortium. The XML schema 212 includes a representation of the hierarchical structure of valid, well-formed, XML documents 202. A well-formed XML document 202 is one which includes the syntax, semantics, and data content in accordance with the current XML specification.

In addition, the database schema 214 comprises Java classes defined for database nodes and database fields of a hierarchical database 204. The Java classes may comprise all or part of a predefined database schema embodied as Java classes. For example, the Java classes may comprise one or more Java classes in the IMS Java Application Programming Interface (API) available from IBM.

The database schema 214 includes a representation of the hierarchical structure of the hierarchical database 204, or a sub-tree thereof. The database schema 214 and XML schema 212 are configured such that for every database field name in the database schema 214 there exists a corresponding XML element name in the XML schema 212.

The system 400 includes an interface 402. The interface 402 receives commands for passing of data between an XML document 202 and a hierarchical database 204. The interface 402 may interact with other software applications or directly with end users. An XML document 202 may be stored or retrieved in response to a command issued to the interface 402. In one embodiment, the command may also include an indicator as to whether the XML document 202 is to be stored or retrieved in a decomposed format, an intact format, or a combination of decomposed format and intact format. Preferably, indicators for decomposed, intact, and combined decomposed and intact formats are embedded within a metadata schema 208 (See FIG. 2B) such as within the XML schema 212.

Figure 5:
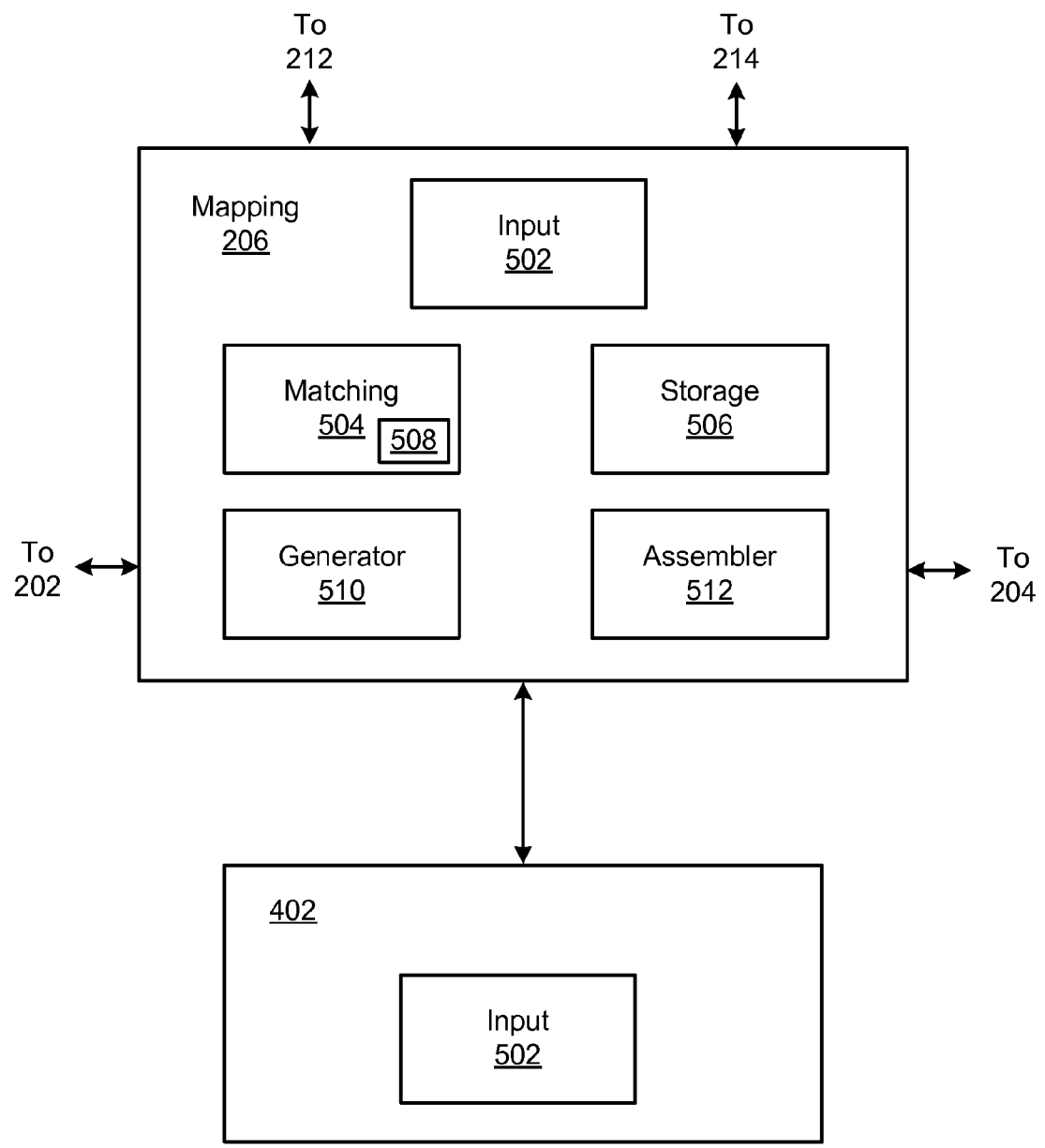
FIG. 5 is a schematic block diagram illustrating sub-components of one embodiment of the system illustrated in FIG. 4.

FIG. 5 illustrates the mapping module 206 and interface 402 in more detail. Preferably, the whole XML document 202 is sent to the hierarchical database 204 in response to a command issued to the interface 402. Similarly, either a whole hierarchical database or a sub-tree thereof is retrieved into an XML document in response to a command issued to the interface 402.

The interface 402 may include an input module 502. Alternatively, the input module 502 may be located within the mapping module 206. The input module 502 may comprise a command line or graphical user interface that allows an end user to pass data between the XML document 202 and the hierarchical database 204. In one embodiment, the interface 402 comprises an extension to existing technology. For example, the interface 402 may comprise new user-defined functions (UDFs) extensions for a structured query language such as, but not limited to, Structured Query Language (SQL). In this manner, interaction with the interface 402 may be consistent and well understood which minimizes a learning curve for using the interface 402.

The input module 502 may be configured to receive an XML document 202 for storage in the hierarchical database 204. Preferably, the XML document 202 is valid, meaning the XML document 202 includes XML elements structurally organized according to the metadata schema 208 (See FIG. 2B). The XML document 202 may be provided by a file system, a web service, or another software module.

The input module 502 is also configured to receive a query to retrieve an XML document 202 for the hierarchical database 204. The query may comprise a key that uniquely identifies a database node in the hierarchical database 204 that is to be the root element in the retrieved XML document 202. Alternatively, the query may comprise a set of commands organized according to SQL.

The input module 502 communicates the XML document 202 or the query to the mapping module 206. The mapping module 206 may include a matching module 504 and a storage module 506 that cooperate to store content data in the XML document 202 within the proper database nodes and database fields of the hierarchical database 204. In one embodiment, the matching module 504 traverses the hierarchical tree structure of the XML document 202. Preferably, the traversal begins at the root XML element and proceeds according to a depth-first methodology.

For each XML element, the matching module 504 finds a corresponding metadata element within the metadata schema 208 (See FIG. 2A). Preferably, the matching module 504 matches an XML element name with a database field name. The match may be a case-sensitive or case-insensitive textual match. Of course, the matching module 504 may use other criteria in addition to, or in place of, the database field name and XML element name.

Once a match is identified by the matching module 504, a storage module 506 extracts the content data from the matching XML element. The content data may comprise data between the begin and end tags of the XML element as well as attributes listed in name-value pairs within the begin tag of the XML element. The storage module 506 stores the content data in the appropriate database field of the hierarchical database 204. The appropriate database node is identified by locating the matching database field within the first representation 222 of the hierarchical structure of the hierarchical database 204. In one embodiment, the storage module 506 issues an external database command, such as a replace command, to store the content data into the database field of the appropriate database node of the hierarchical database 204. The database field is identified by the matching database field name provided by the matching module 504.

If an XML element includes attributes, the matching module 504 finds the corresponding database fields in the hierarchical database 204 using the matching metadata element and provides the database field name(s) for the attributes to the storage module 506. The storage module 506 may then issue insert commands to store the values of the attributes in database fields associated with the attributes of the XML element. Typically, because there is a one-to-one relationship between the XML element and the attributes, the values for the attributes are stored in database fields of a particular database node in the hierarchical database 402.

The matching module 504 and storage module 506 continue to process each XML element in the XML document 202 until all XML elements of the XML document 202 have been processed and stored. In this manner, the data of the XML document is stored in a decomposed format in the hierarchical database 204. Decomposed storage may be particularly useful where the XML document 202 includes significant amounts of content data or the XML document is used primarily to transport data. In decomposed format, the content data is treated like any other data in the hierarchical database 204. Consequently, the data may be searched, indexed, and backed up as needed.

In one embodiment, the matching module 504 includes an analysis module 508 that is activated when the XML document 202 is stored in intact format. The analysis module 508 will be discussed in more detail below in relation to FIG. 8.

If the input module 502 receives a query, an XML document 202 is to be retrieved from the hierarchical database 204. Typically, the query is in the form of a SQL statement. The "where" clause and "from" clause of the SQL statement may include expressions normally accepted by the hierarchical database 204. The "select" clause may invoke the input module 502 to retrieve an XML document 202 from data in the hierarchical database stored in decomposed or native format. The XML document 202 may be one stored in decomposed format earlier or a new XML document 202 generated on data stored in the hierarchical database 204 from another source.

The input module 502 provides the query to the matching module 504 which locates a database node identified by the query. The database node may be the root node of the hierarchical database 204 or a sub-node of the database 204. If the database node is a sub-node, the retrieved XML document 202 will comprise a sub-tree of the hierarchical database 204 that includes the identified database nodes and all descendent database nodes.

From the identified database node, the matching module 504 traverses the hierarchical database 204 or sub-tree of the database using a depth first search. Alternatively, the database sub-tree may be traversed using a breadth-first search. The matching module 504 matches each database field of the sub-tree in the hierarchical database 204 with a metadata element in the metadata schema 208 (See FIG. 2A).

Preferably, the matching module 504 traverses the hierarchical database 204 or sub-tree by making external calls to the database server/engine. In a relational database, such traversal would require dynamically adjusting a potentially complex query. Advantageously, because the database nodes desired for building the XML document 202 are in a hierarchical arrangement like the database nodes in the hierarchical database 204, database node access functions of the hierarchical database 204 may be used through external calls to readily traverse the sub-tree and access each database node. For example, in an IMS database 204 the matching module 504 may issue "Get Next In Parent—GNP" calls to traverse the sub-tree. The IMS database 204 manages locating the next database node instead of the matching module 504.

The matching module 504 communicates a matching metadata element to a generator module 510. The generator module 510 generates an XML element according to the XML element definition included in the metadata element. The XML element comprises the XML formatting characters, keywords, and tokens for defining a valid XML element.

In addition, the XML element includes content data that is retrieved from the matching database field in the hierarchical database 204. If necessary, the generator module 510 may also perform a type conversion on the data from the database field as well as an encoding conversion. In certain embodiments, the matching metadata element includes an indicator as to whether the database field data is regular content data or an attribute in a name-value pair of the XML element. If the indicator is present, the generator module 510 produces the appropriate name-value pair for the attributes section of the XML element.

The generated XML element may then be provided to an assembler 512. The assembler 512 assembles all the generated XML elements into a single XML document 202 once the final XML element is generated. The assembler 512 structures the XML elements according to the second representation 224 of the hierarchical structure of valid XML documents 202 included in the metadata schema 208.

Figure 6:
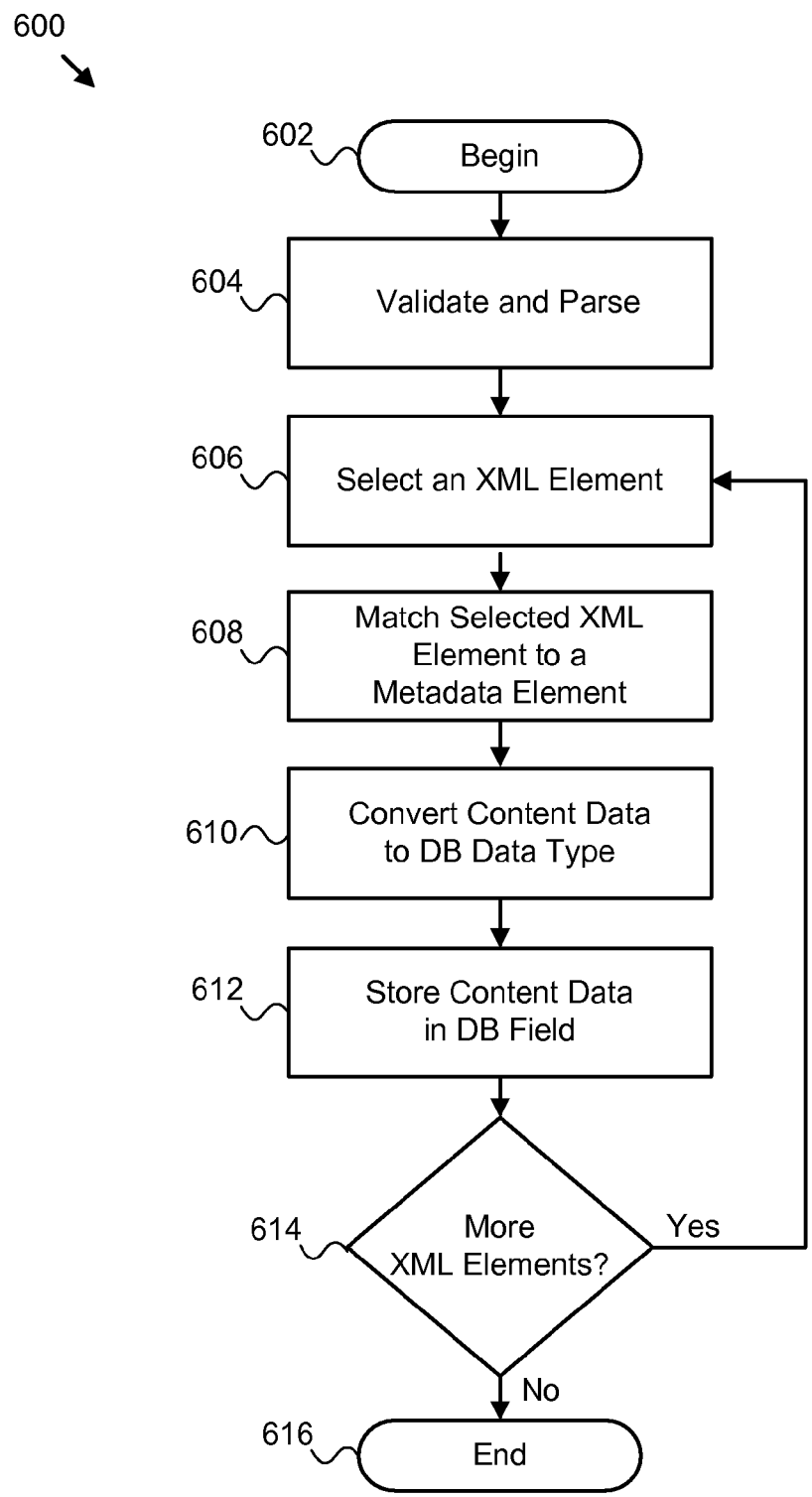
FIG. 6 is a schematic flow chart diagram illustrating a method of the present invention for passing data between an XML document and a hierarchical database such that content data of the XML document is stored in the hierarchical database in a decomposed format.

FIG. 6 illustrates a flow chart of a method 600 for storing XML documents 202 in a decomposed format within a hierarchical database 204. Preferably, the hierarchical database 204 has not been modified to accommodate the method 600. The method 600 begins 602 when an XML document 202 is provided for storing in the hierarchical database 204.

In one embodiment, the XML document 202 is first validated and parsed 604. The XML document 202 is validated against an XML schema. The XML schema defines the structure, content, and semantics of all valid XML documents. Validation and parsing of the XML document 202 ensures that all required data is provided and that provided data is in the proper format and structure.

Next, an XML element is selected 606 from the parsed XML elements of the XML document 202 according to a depth first traversal of XML elements structured according to the second representation 224 of the hierarchical structure of valid XML documents 202 included in the XML schema. Alternatively, an XML element may be selected 606 by a depth first or breadth first search of the validated XML document 202.

Then, the selected XML element is matched 608 with a metadata element defined in the metadata schema 208 (See FIG. 2A). Preferably, the matching metadata element includes an XML element data type identifier that indicates the data type for the content data in the XML element and a database field type identifier that indicates the data type for the data stored in the database field. In one embodiment, the database field type identifier is within the database schema 214. An XML element data type identifier that maps to the database field type identifier may be included within the document schema 212. Together the database field type identifier and XML element data type identifier facilitate conversion of an XML element content data type to a database field data type and vice versa.

If there is a data type mismatch, the content data is converted to the database type for the database field. Similarly, if the database field is stored in a different encoding format from that of the XML element content data, an encoding conversion may be performed. For example, XML data is typically stored in Unicode encoding format and IMS database data is typically stored in Extended Binary Coded Decimal Interchange Code (EBCDIC) encoding format.

Finally, the properly encoded content data of the appropriate data type from the XML element is stored 612 in the database field within the database. The database node for the database field is identified by the matching metadata element. Then, a determination 614 is made whether more XML elements have yet to be processed and stored. If so, the method 600 selects a next XML element. If not, the method 600 ends 616.

Figure 7:
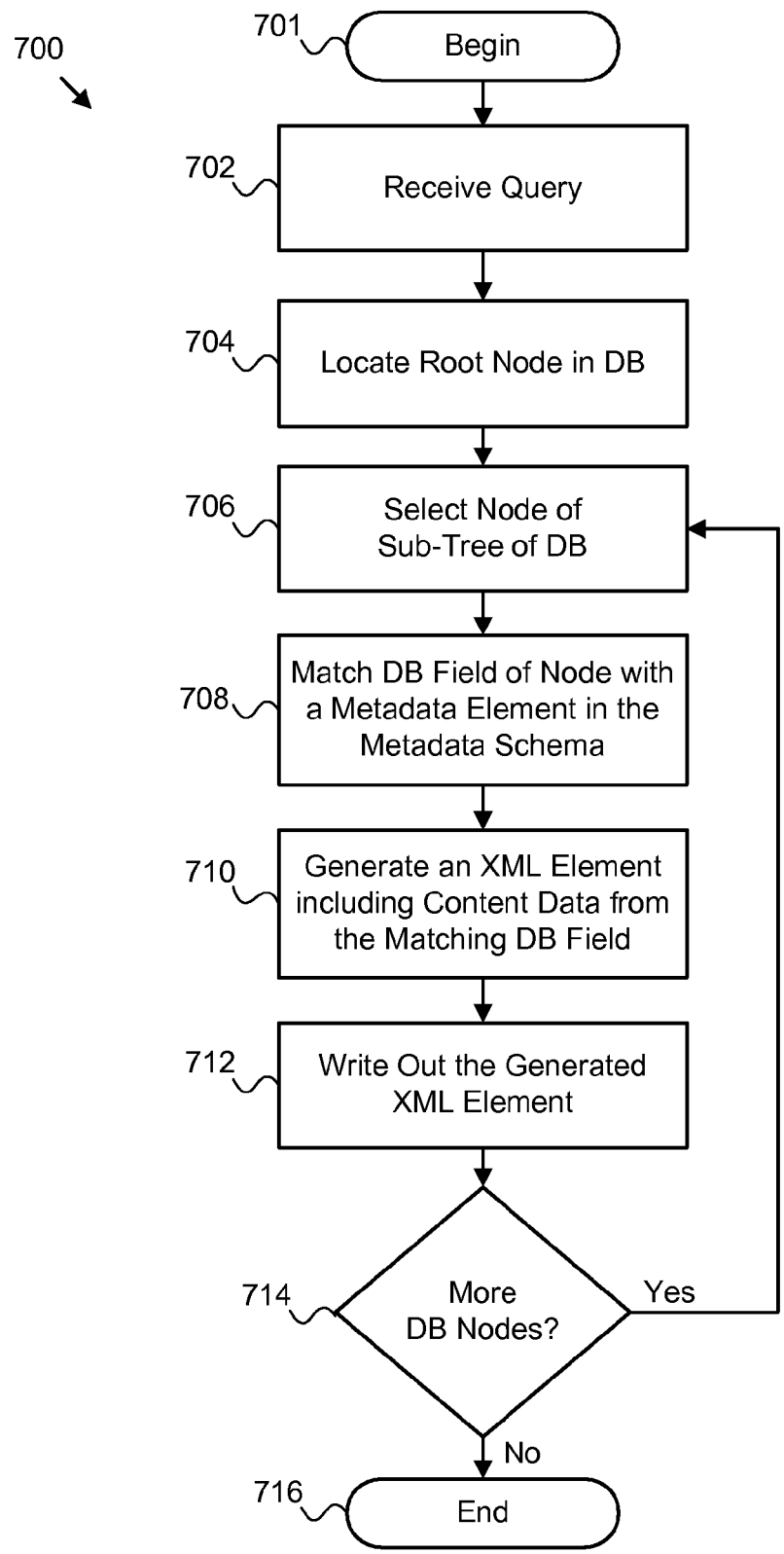
FIG. 7 is a schematic flow chart diagram illustrating a method of the present invention for passing data between an XML document and a hierarchical database such that content data of the XML document stored in the hierarchical database in a decomposed format is retrieved into an XML document.

FIG. 7 illustrates a flow chart of a method 700 for retrieving an XML document 202 from a hierarchical database 204. The XML document 202 may have been previously stored in decomposed format or comprise data fields populated by another database transaction. In this manner, native data in the hierarchical database 204 may be extracted and packaged in an XML document 202 as necessary.

The method 700 begins 701 by receiving 702 a query. Preferably, the query is in the form of a standard SQL statement that includes reference to a User-Defined Function (UDF). The query may be provided by a user or a software module. An example query may be: "SELECT retrieveXML (Model) FROM DealerDB.Model WHERE Model.Car-Year=1989". In the example, the "retrieveXML(Model)" expression initiates the method 700. The "Model" argument identifies a database root node in the hierarchical database 204.

Next, the root node in the database 204 is located 704. In the example above, the root node is the database node named "Model". Typically, the sub-tree of the hierarchical database 204 beneath the root node is processed to generate the XML document 202.

Initially, the root node is selected 706. Subsequent processing of the sub-tree selects child nodes of the root node. Next, each database field of the database node is matched 708 to a metadata element in the metadata schema 208. In certain embodiments, a matching module 504 may match the database field name to a metadata element name to identify the matching metadata element. As discussed above, the matching module 504 may traverse the hierarchical database 204 or sub-tree using external commands to the hierarchical database 204 which utilize built in tree-traversal functions of the hierarchical database 204.

Then, an XML element is generated 710 as defined in the matching metadata element. The XML element comprises content data from the matching database field. The content data may be converted to a suitable XML data type and/or encoding format if necessary. The data type information and encoding format information may be indicated by identifiers in the matching metadata element.

In one embodiment, the generated XML element is written out 712 to a file or other persistent storage location. Alternatively, the XML element may be written to temporary storage such as memory. Typically, the XML element is written out 712 according to a hierarchical structure dictated by the second representation 224 (See FIG. 2B) of the hierarchical structure of valid XML documents 202. End tags for the generated XML elements may be written out once the whole sub-tree has been processed. Alternatively, the end tags are written out with the remainder of the XML element, and nested XML elements are simply inserted at the appropriate location in the XML document 202.

Finally, a determination 714 is made whether all of the database nodes of the sub-tree have been processed. If there are more database nodes, the method 700 returns to step 706. If not, the method 700 ends 716.

Figure 8:
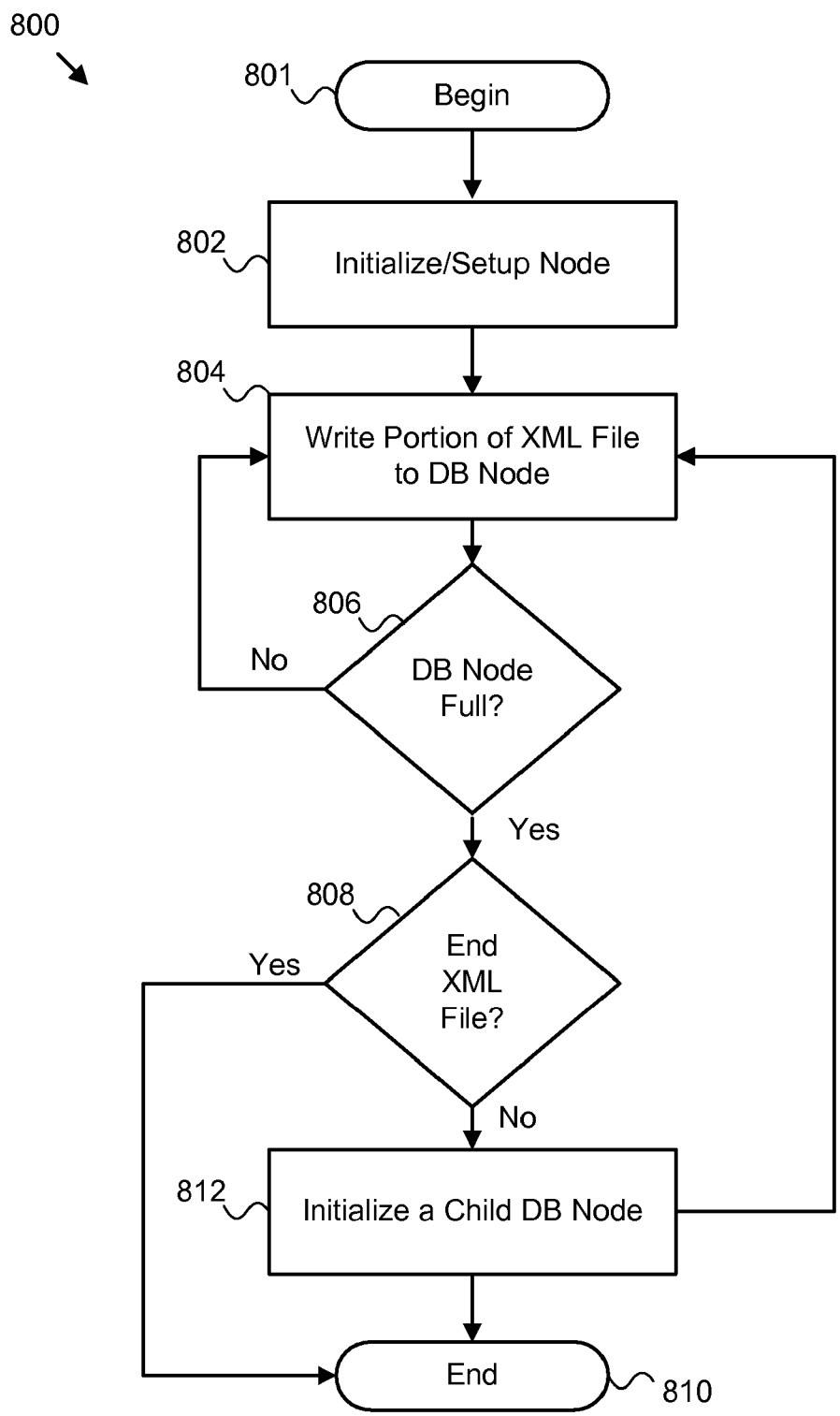
FIG. 8 is a schematic flow chart diagram illustrating a method of the present invention for passing data between an XML document and a hierarchical database such that the XML document is stored in the hierarchical database in an intact format.

FIG. 8 illustrates a flow chart of a method 800 for storing XML documents 202 in an intact format within a hierarchical database 204. An intact format means that the metadata (formatting characters, strings, version identifiers, and the like) within the XML document 202 is preserved along with content data once the XML document 202 is stored in the hierarchical database 204.

The intact storage format may be used in a variety of circumstances. For example, when the XML document 202 does not contain data that needs to be loaded in to standard database fields such that standard non-XML applications can access the data. Intact storage may be useful when the content data of the XML document 202 is variable, unknown, or significantly larger than the size of database fields in the database 204.

For example, the content data may comprise pages and pages of content data representative of a human-readable document such as a user manual. Such content data may not need to be stored within a standard database field. Instead, it may be desirable that the whole XML document 202 be stored in the hierarchical database 204 to utilize the backup and recovery, security, and other features of the database 204.

Intact storage may be desired when retrieval speed of the whole XML document 202 is important. Alternatively, intact storage may be used where no document schema 212 associated with the XML document 202 exits. For example, no XML schema 212 may exist for the XML document 202.

In one embodiment, the method 800 begins 801 once an XML document 202 is received preferably by way of a command identifying the location of the XML document 202. In addition, the command identifying the location of the XML document 202 may provide a database node identifier. The database node identifier uniquely identifies a database node within the hierarchical database 204 to receive the XML document 202. Preferably, the database node identifier identifies either a root node of new database or a new database node that has been added by extending an existing database 204.

In certain embodiments where database nodes are of set, predefined sizes, the new database node is of a particular type that restricts the new database node to a single child node. Similarly, the child node may be restricted to having only one child node. The new database node may include a flag whether the database node has a child, a grandchild, a great-grandchild, etc. Alternatively, where database nodes may be of variable size, a single database node may be created of a size sufficient to store the entire XML document 202 in intact format.

First, a first database node is initialized 802. The first database node is preferably the newly created database node identified by the database node identifier. Initializing the first database node may comprise determining the total length of the XML document 202, and determining how many generations of child database nodes will be required to store the XML document 202 intact. If the length of the XML document 202 exceeds the size of the first database node, a flag in the first database node is set to indicate that one or more generations of child database nodes exist. These child database nodes may be referred to as overflow nodes. In addition to setting the flag indicating additional overflow nodes, initialization 802 may include storing version information, the length of the portion of the database node that will hold the raw data, and the like. In certain embodiments, initialization includes creating the appropriate number of child database nodes, overflow nodes, in the hierarchical database 204 to properly store the XML document 202 in intact format.

Initialization 802 may also include identifying one or more break points within the XML document 202. The break points represent where the XML document 202 will be physically divided between the first database node and any subsequent child database nodes. Break points are determined based on the size of the raw data in the XML document 202 and the sizes of the first database node and any child database nodes, excluding any flag or header information.

Next, the method 800 writes 804 a portion of raw data from the XML document 202 into the first database node. Error checking on the written portion may be performed. Raw data means the data has not been parsed, validated, or converted. The portion may comprise a length packet such as 8 bit, 16 bit, 32 bit, or the like. Alternatively, the portion may be the same size as the length of the portion in the database node that will receive the raw data.

Portions of the XML document 202 are written beginning with the beginning of the XML document 202. Once a portion is written, a determination 806 is made whether the first database node is full. If not, a next sequential portion of the XML document 202 is written 804 to the first database node.

If the first database node is full, a determination 808 is made whether the end of the XML document 202 has been reached. If so, the method 800 ends 810. If not, a second database node that is a child of the first database node is initialized 812. Typically, database nodes are filled once a break point is reached. Consequently, the method 800 continues by writing 804 a portion of raw data beginning at the break point from the XML document 202 into the second database node. The writing process continues until the whole XML document 202 is stored in one or more database nodes of the hierarchical database 204.

Referring now to FIGS. 6 and 8, in certain embodiments, an XML document 202 may be stored in decomposed format with a sub-tree of the XML document 202 stored intact. Preferably, the XML document 202 includes an associated document schema 212 such as an XML schema 212. The document schema 212 may include different types of directive metadata elements. A metadata directive is an indicator that causes the XML element and/or a sub-tree, including the XML element as the root element, to be handled differently in being passed between the XML document 202 and the hierarchical database 204.

In one embodiment, a metadata directive element signals that the XML element within which the metadata directive element is encountered is to be stored in intact format. For example, when the method 600 selects 606 an XML element, a determination may be made whether the XML element includes any metadata directives. If a metadata directive is present for storing the selected XML element and its descendents intact, the method 600 may initiate the method 800. The method 800 may operate as described above except that the root XML element from which intact storage begins is the selected 606 XML element from method 600 rather than the root XML element for the whole XML document 202.

Similarly, when a decomposed XML document 202 is retrieved from the hierarchical database 202 as described in relation to FIG. 7, the same metadata directive may be used to determine that a particular database node is to be retrieved according to a method 900 for retrieving intact XML documents 202 or sub-trees. Method 900 is discussed in more detail in relation to FIG. 9. In this manner, XML documents 202 stored using a mixed format of intact and decomposed may also be retrieved as necessary.

Intact storage of an XML document 202 results in binary data in the database nodes of the hierarchical database 204. The binary data is not available for use by other applications using the hierarchical database 204 until the XML document 202 is retrieved. However, it may be desirable for certain information within the XML document 202 to be made available such that XML-enabled applications using the hierarchical database 204 may identify and or locate the XML document 202 as necessary.

Consequently, in certain embodiments, particular XML elements of an XML document 202 being stored in intact format may be stored in indexable database nodes. In a hierarchical database 204 such as IMS, these indexable database nodes may comprise side segments.

Referring now to FIGS. 6 and 8, as each XML element is selected 606 a determination may be made whether the XML element includes any metadata directives 242 (See FIG. 2D). In one embodiment, the analysis module 508 may examine each XML element to search for metadata directives 242. In addition, the analysis module 508 may communicate with other modules of the present invention to carry out the metadata directive 242 depending on the type of metadata directive 242 found.

If a metadata directive 242 is within the selected XML element and the metadata directive 242 comprises an index indicator, all or a portion of the XML element may be stored in indexable database nodes such as side segments. The index indicator may include parameters that identify what parts of the XML element are to be stored in the indexable database nodes. The index values from the XML element (content data and/or attribute values) is then stored in an indexable database node.

Then, a secondary index may be generated that references the root database node in the hierarchical database 204 and the indexable database nodes. The secondary index allows the indexable database nodes to be located using database queries. In this manner, a user or XML-enabled application using the hierarchical database 204 may locate an XML document 202 or portions thereof when the XML document 202 is stored in the hierarchical database 204 in intact format.

Figure 9:
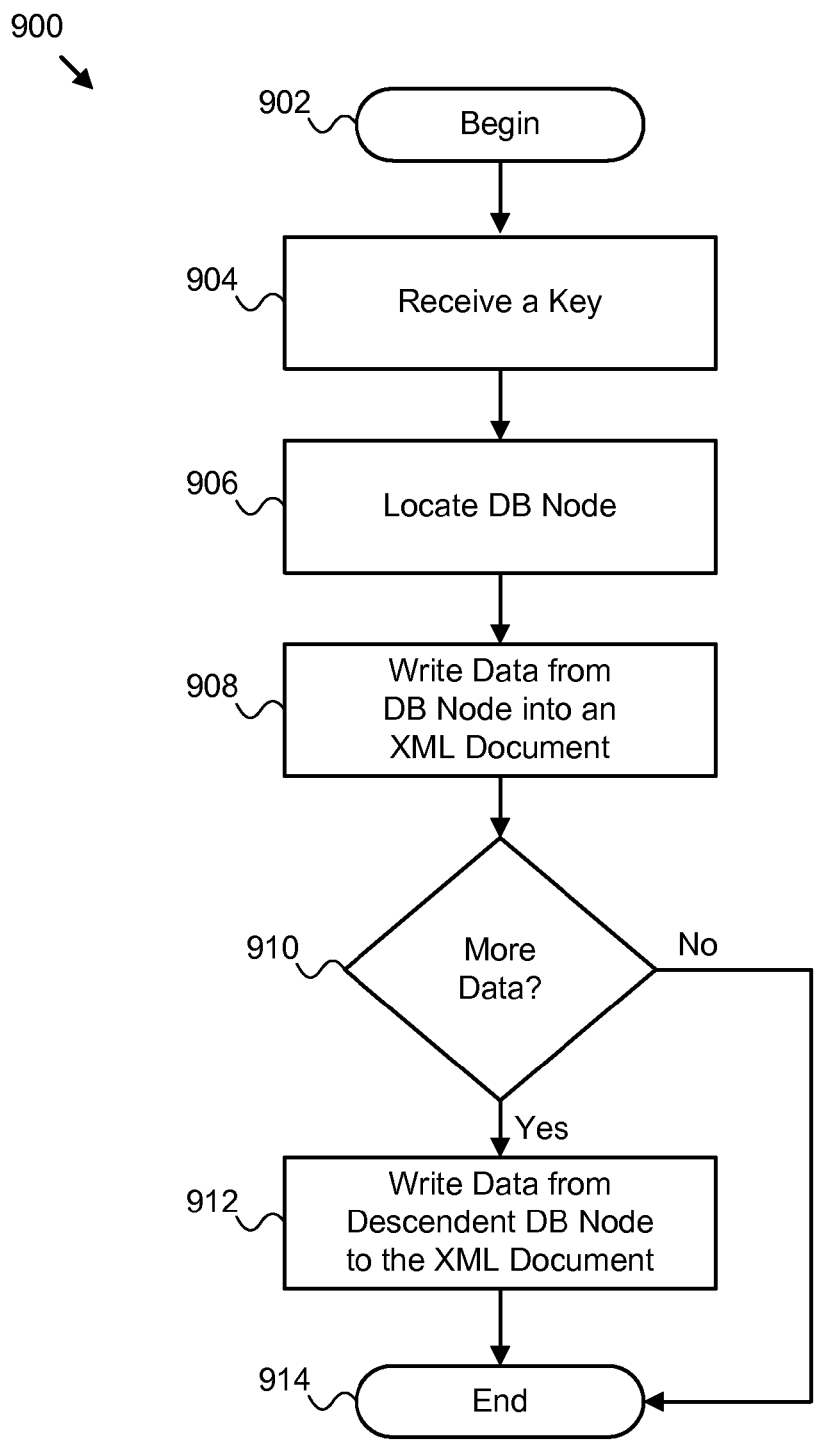
FIG. 9 is a schematic flow chart diagram illustrating a method of the present invention for passing data between an XML document and a hierarchical database such that an XML document stored in an intact format is retrieved from the hierarchical database.

FIG. 9 illustrates a flow chart of a method 900 for retrieving XML documents 202 stored in an intact format within a hierarchical database 204. The method 900 uses a metadata schema 208 derived from the hierarchical database 204 or a view of the hierarchical database 204. The metadata schema 208 includes a metadata element for each database node within the hierarchical database 204.

The method 900 begins 902 by receiving 904 a key. Preferably, the key is unique. The key is used to locate 906 a first database node within the hierarchical database 204 where the intact XML document 202 has been stored. Next, raw data is sequentially written 908 from the data portion of the first database node to an XML document 202 such as an XML file. Once all the raw data is written from the first database node, a determination 910 is made whether the first database node has a descendent database node storing more raw data. As mentioned, this may be indicated by a flag in the first database node.

If more raw data exists for the XML document 202, the method 900 locates the child database node and sequentially writes 912 raw data from the descendent database node into the XML document 202. If the descendent database node includes a descendent database node, the process of writing the data is repeated until all the raw data in all the descendent database nodes has been written to the XML document 202. In certain embodiments, if a descendent database node includes one or more database node twins (descendent database nodes of the same type as the current descendent database node), the process of writing the data is repeated on the database node twins such that all the raw data in the database node twins is written to the XML document 202 before a next descendent database node is selected. If no more raw data exists, in descendent database nodes or database node twins, for the XML document 202, the method 900 ends 914.

In summary, the present invention provides an apparatus, system, and method for defining a metadata schema to facilitate passing data between an XML document and a hierarchical database. The present invention defines a metadata schema that complies with an accepted, text-based, industry standard, an XML schema, for valid, well-formed, XML documents. The XML schema defines a set of valid, well-formed XML documents. This set is automatically the set of valid, well-formed XML documents that may be passed into and out of a hierarchical database through mapping of the data. The present invention also defines a metadata schema that accommodates user-defined database views of the hierarchical database and is readily modifiable to adjust to changes in the user-defined database views.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for defining a metadata schema to facilitate passing data between an eXtensible Markup Language (XML) document and a hierarchical database, the apparatus comprising:
   a database accessor configured to access a database schema indicative of database field names and a hierarchical structure for a hierarchical database;
   a document accessor configured to access a document schema that defines the hierarchical structure, content data syntax, and semantics of valid, well-formed, XML documents that can be passed into and out of the hierarchical database, the document schema including an XML element name that maps to a database field name in the database schema; and
   an association module configured to relate the database schema and the document schema to provide a metadata schema that enables data to be passed between an XML document and the hierarchical database, the database schema comprising a database field type identifier and the document schema comprising an XML element data type identifier that maps to the database field type identifier to facilitate converting content data between the XML element data type and the database field type based on the database field type identifier and the XML element data type identifier.

2. The apparatus of claim 1, wherein the document schema comprises an XML schema that complies with an industry standard for XML schemas.

3. The apparatus of claim 2, wherein the industry standard for XML schemas comprises version 1.0 as set forth by the World Wide Web Consortium.

4. The apparatus of claim 1, wherein the database schema comprises a predefined database schema comprising a set of java classes representative of one or more nodes and one or more fields of the hierarchical database.

5. The apparatus of claim 1, wherein the document schema comprises at least one directive metadata element configured to not interfere with third-party applications using the document schema and to facilitate passing data between the XML document and the hierarchical database.

6. The apparatus of claim 5, wherein the at least one directive metadata element is selected from the group of directives consisting of a storage and retrieval directive, an index directive, and a hierarchical database indicator directive.

7. The apparatus of claim 1, wherein the hierarchical database comprises an Information Management System (IMS) database.

8. A method for defining a metadata schema to facilitate passing data between an eXtensible Markup Language (XML) document and a hierarchical database, the method comprising:
   accessing a database schema indicative of database field names and a hierarchical structure for a hierarchical database;
   accessing a document schema that defines the hierarchical structure, content data syntax, and semantics of valid, well-formed, XML documents that can be passed into and out of the hierarchical database, the document schema including an XML element name that maps to a database field name in the database schema;
   relating the database schema and the document schema to provide a metadata schema that enables data to be passed between an XML document and the hierarchical database; and
   wherein the document schema comprises at least one directive metadata element configured to not interfere with third-party applications using the document schema and to facilitate passing data between the XML document and the hierarchical database.

9. The method of claim 8, wherein the document schema comprises an XML schema that complies with an industry standard for XML schemas.

10. The article of manufacture of claim 9, wherein the industry standard for XML schemas comprises version 1.0 as set forth by the World Wide Web Consortium.

11. The method of claim 8, wherein the database schema comprises a predefined database schema comprising a set of java classes representative of one or more nodes and one or more fields of the hierarchical database.

12. The method of claim 8, wherein the database schema comprises a database field type identifier and the document schema comprises an XML element data type identifier that maps to the database field type identifier to facilitate converting content data between the XML element data type and the database field type based on the database field type identifier and the XML element data type identifier.

13. The method of claim 8, wherein the at least one directive metadata element is selected from the group of directives consisting of a storage and retrieval directive, an index directive, and a hierarchical database indicator directive.

14. The method of claim 8, wherein the hierarchical database comprises an Information Management System (IMS) database.

15. An article of manufacture comprising a program storage medium readable by a processor and embodying one or more instructions executable by a processor to perform a method for defining a metadata schema to facilitate passing data between an eXtensible Markup Language (XML) document and a hierarchical database, the method comprising:

accessing a database schema indicative of database field names and a hierarchical structure for a hierarchical database;

accessing a document schema that defines the hierarchical structure, content data syntax, and semantics of valid, well-formed, XML documents that can be passed into and out of the hierarchical database, the document schema including an XML element name that maps to a database field name in the database schema;

relating the database schema and the document schema to provide a metadata schema that enables data to be passed between an XML document and the hierarchical database; and wherein the database schema comprises a database field type identifier and the document schema comprises an XML element data type identifier that maps to the database field type identifier to facilitate converting content data between the XML element data type and the database field type based on the database field type identifier and the XML element data type identifier.

16. The article of manufacture of claim 15, wherein the document schema comprises an XML schema that complies with an industry standard for XML schemas.

17. The article of manufacture of claim 16, wherein the industry standard for XML schemas comprises version 1.0 as set forth by the World Wide Web Consortium.

18. The article of manufacture of claim 15, wherein the database schema comprises a predefined database schema comprising a set of java classes representative of one or more nodes and one or more fields of the hierarchical database.

* * * * *